United States Patent [19]

Sporer

[11] Patent Number: 5,697,301
[45] Date of Patent: Dec. 16, 1997

[54] SUSPENSION TYPE CONVEYOR MEANS

[75] Inventor: Klaus Sporer, Altenstadt, Germany

[73] Assignee: RSL Logistik GmbH & Co., Landsberg/Lech, Germany

[21] Appl. No.: 679,631

[22] Filed: Jul. 10, 1996

[30] Foreign Application Priority Data

Jul. 18, 1995 [DE] Germany ............... 295 11 555 U

[51] Int. Cl.[6] ............................................. B61B 3/00
[52] U.S. Cl. ......................... 104/96; 104/130.1; 104/163
[58] Field of Search ..................... 104/96, 99, 130.1, 104/162, 163

[56] References Cited

U.S. PATENT DOCUMENTS

| 2,120,052 | 6/1938 | Bishop | 104/96 |
|---|---|---|---|
| 3,009,424 | 11/1961 | Chill et al. | 104/96 |
| 3,577,930 | 5/1971 | Rooklyn | 104/99 |
| 3,696,890 | 10/1972 | Armstrong | 104/99 |
| 3,807,314 | 4/1974 | Slemmons | 104/96 |
| 5,111,750 | 5/1992 | Nozaki et al. | 104/99 |
| 5,404,992 | 4/1995 | Robu et al. | 198/465.4 |

FOREIGN PATENT DOCUMENTS

| 0 582 047 | 2/1994 | European Pat. Off. . | |
|---|---|---|---|
| 9402990 | 6/1995 | Germany . | |
| 1109850 | 4/1968 | United Kingdom | 104/96 |

*Primary Examiner*—S. Joseph Morano
*Attorney, Agent, or Firm*—Finnegan, Henderson, Farabow, Garrett & Dunner

[57] ABSTRACT

A suspension type conveyor device including conveyor paths for conveyed carrier members conveyed in suspended fashion, and a constructionally simple and operationally reliable switch for transferring the conveyed carrier members from at least two conveyor paths entering into the switch to at least one conveyor path exiting from the switch. The switch cooperates with a stop surface on the conveyed members and is provided at its side facing the entering conveyor paths with an inlet opening that bridges all of the entering conveyor paths and an outlet opening oriented towards the exiting conveyor path.

12 Claims, 5 Drawing Sheets

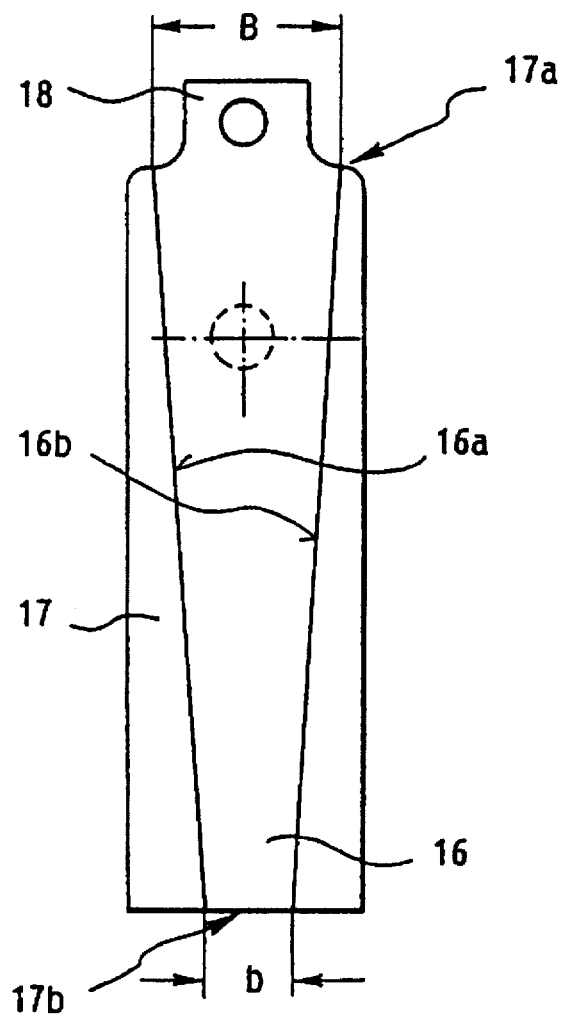
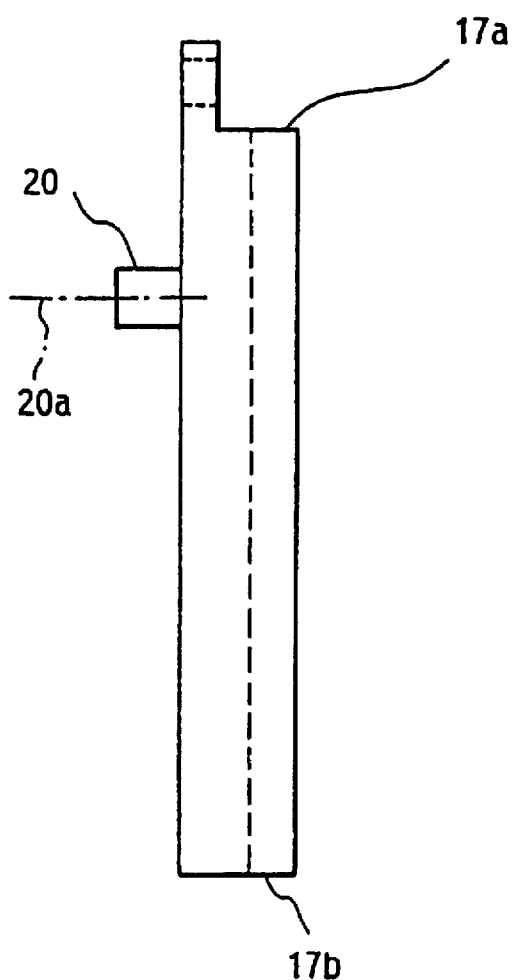
FIG. 4A    FIG. 4B
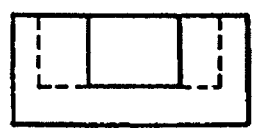
FIG. 4C

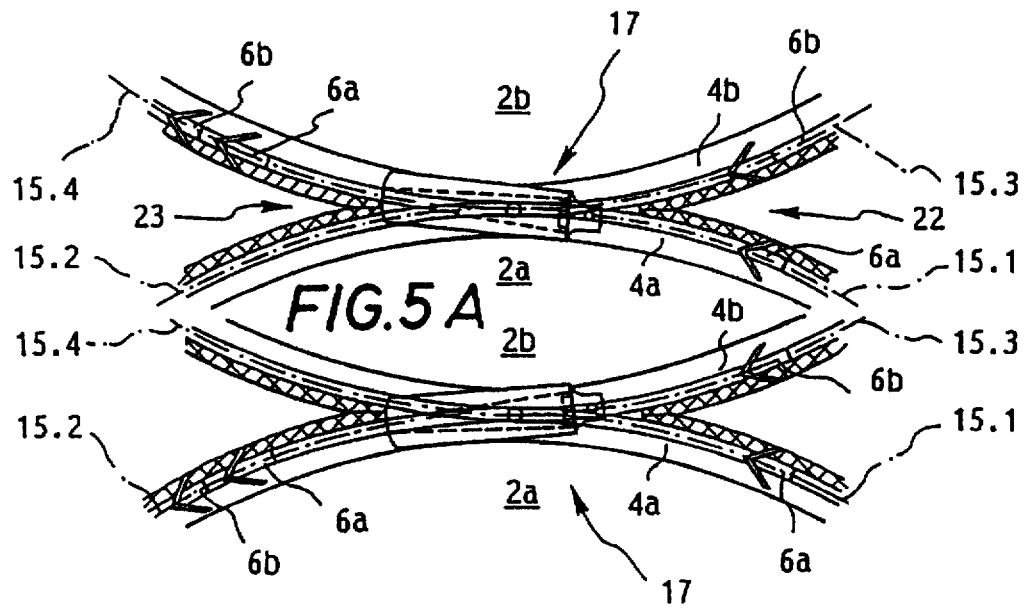
FIG.5A
FIG.5B
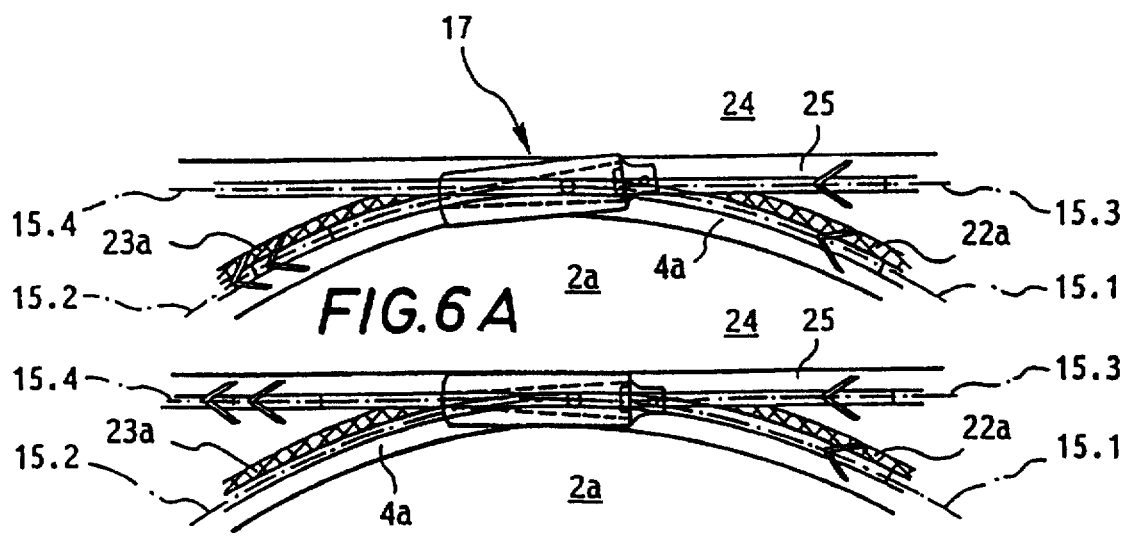
FIG.6A
FIG.6B

5,697,301

SUSPENSION TYPE CONVEYOR MEANS

BACKGROUND OF THE INVENTION

The present invention relates to a supension type conveyor device including a conveyor path for conveyed device that are conveyed in suspended fashion on rails.

Unlike floor conveyor systems which comprise conveyed means that are conveyed on rollers and in tracks, switches and other transitions between two rails in suspension type conveyor means for means conveyed in suspended form are constructionally more difficult as to their design, since conveyed means for suspension type conveyor means naturally extend both above and below the rails on which they are conveyed. As a result, it is not possible to resort to some simple guidance by way of a track.

There are known many switches and transitions from rail to rail for suspension type conveyors means. For instance, EP 582 047 A1 shows a suspension type conveyor means for a suspended conveyed means which comprises a carrier and two rollers that are symmetrically arranged relative to the longitudinal center line of the carrier, which line is vertical during conveyance, and that project laterally from the carrier. The rollers have either a conical configuration or have a cylindrical shape and are rotatable about downwardly inclined axes so that they are capable of gripping over outwardly and downwardly inclined running surfaces of a rail and of rolling on the same, the conveyed means being in a position to roll either with both rollers simultaneously on two tracks or with only one roller on one track.

In addition to the rollers, the conveyed means contains, at both sides of the longitudinal center line of the carrier, two support surfaces that extend substantially at right angles with the longitudinal center line and with the aid of which the conveyed means can be deposited on the carrier surfaces. When the carrier surfaces are moved, each of the conveyed means is carried over the conveyor path. This carrier surface can, for instance, be arranged on a deflection wheel which carries the conveyed means through a switch in which the conveyed means either remains on the carrier surface of the deflection wheel entering into the switch and exits again from the switch, or is moved onto an adjoining rail path, and exits on said rail path from the switch.

The switch includes a pusher which comprises a downwardly open groove. The groove is entered by a projection which is arranged on the conveyed means in the extension of its vertical longitudinal center line and which in response to the respective position of the pusher abuts on the one or the other of the two guide surfaces defining the groove, and which in response to the position of the pusher is either retained on the deflection wheel or is guided on the second rail path. With this design, however, it is only possible to connect a single entering rail to two exiting rails.

It is the object of the present invention to provide a suspension type conveyor device for transferring conveyed device in a constructionally simple manner from more than two incoming rails to another rail path.

SUMMARY OF THE INVENTION

This object is achieved in accordance with the present invention by providing a suspension type conveyor device including conveyor paths for conveyed means conveyed in suspended fashion, and a guide means for transferring the conveyed means from at least two conveyor paths entering into the guide means to at least one conveyor path existing from the guide means, the guide means cooperating with at least one stop surface on the respectively conveyed means and being provided at its side facing the entering conveyor paths with an inlet opening bridging all entering conveyor paths and with an outlet opening oriented towards the respectively existing conveyor path.

The design according to the invention ensures that even if there is more than one entering rail no conveyed means will hit against a surface blocking its way, irrespective of the rail on which the conveyed means arrives. The enlarged inlet opening which covers all rails ensures that each conveyed means can enter into the guide means from any direction and in any case and is directed by it into the desired direction.

In a preferred embodiment, the guide means is formed as a switch for connecting the entering conveyor paths to at least two exiting conveyor paths and is pivotable about an axis. This is of special advantage if more than one rail leaving the switch must be operated and the guide means must be moved. In this case, too, it is ensured that all incoming conveyed means can enter into the switch, no matter from which direction they arrive. None of the entering conveyor paths is blocked by the movable guide means. Rather, the inlet of the switch remains always open for all directions while it is only the outlet opening that is pivoted towards the desired direction or the desired conveyor.

In another preferred embodiment the axis is arranged at a distance relative to the inlet opening. This improves the entry of the conveyed means into the switch.

In a further preferred embodiment, the axis is arranged at a point where the entering conveyor paths have the smallest distance from each other. This reduces the necessary pivot angle.

BRIEF DESCRIPTION OF THE INVENTION

Embodiments of the invention shall now be explained in more detail with reference to the drawings, in which:

FIGS. 4A, 4B & 4C are respectively a view from below, a lateral view and a front view of a guide means for the suspension type conveyor device according ot the invention;

FIGS. 5A and 5B show various modes of operation of the suspension type conveyor device according to FIGS. 1 and 2; and FIGS. 6A and 6B show various modes of operation of the suspension type conveyor device according to FIG. 3.

DETAILED DESCRIPTION OF THE INVENTION

Figure 1:
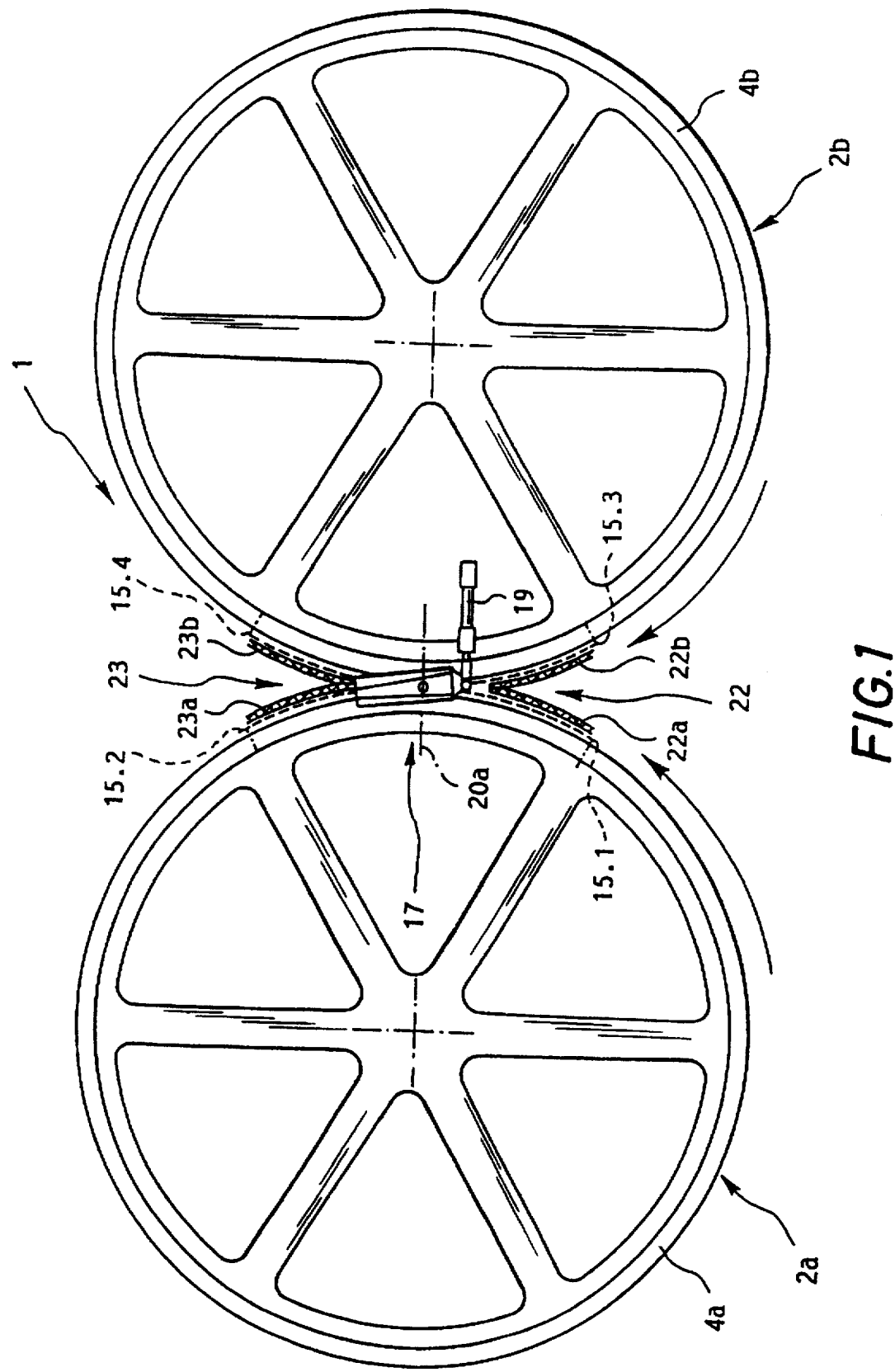
FIG. 1 is a partial illustration and top view of a first embodiment of a suspension type conveyor device according to the invention.
Figure 2:
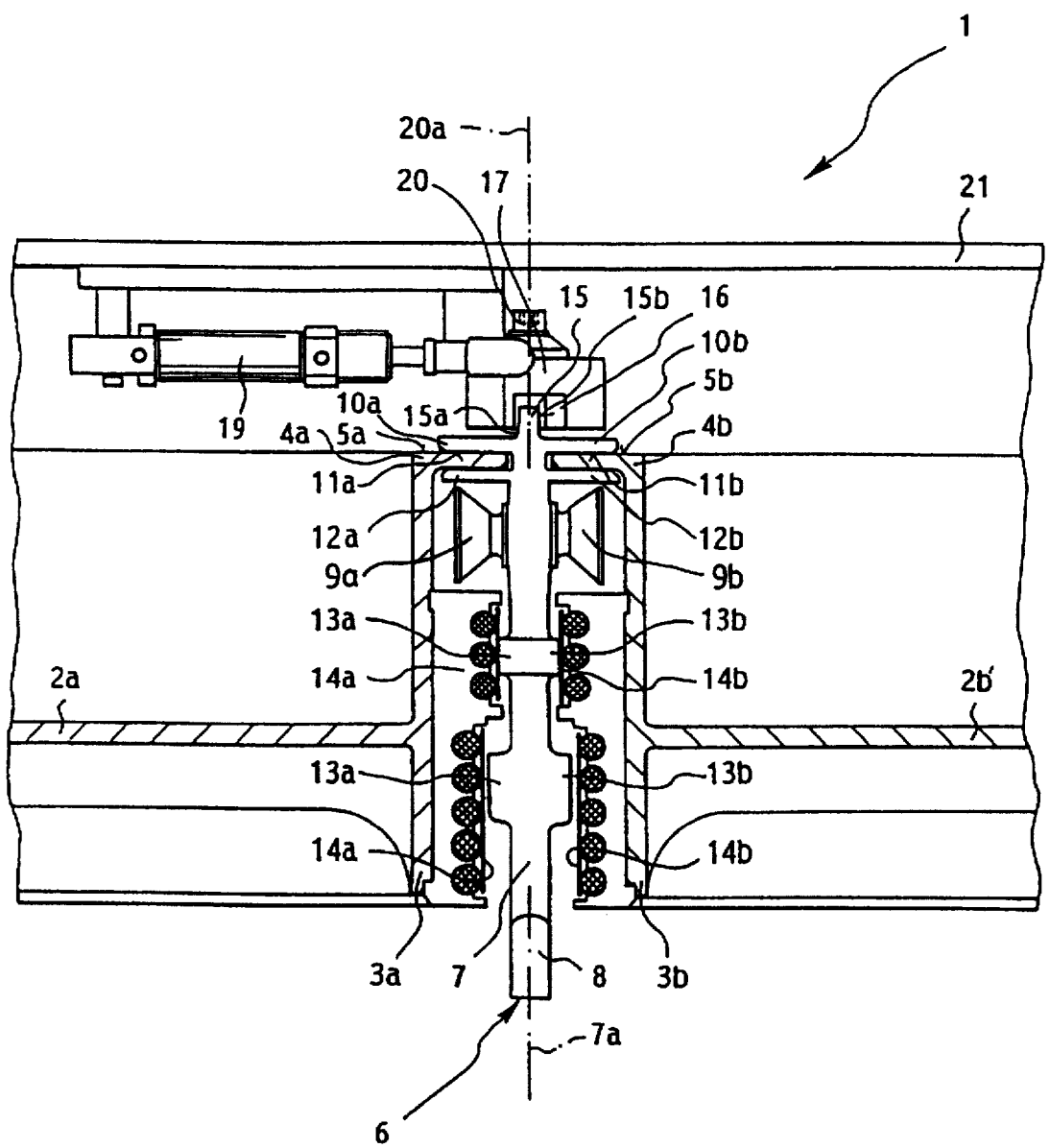
FIG. 2 shows a detail of the suspension type conveyor device of FIG. 1, viewed from the front.

FIGS. 1 and 2 show a section of a suspension type conveyor device 1. The suspension type conveyor device 1 comprises two wheels 2a and 2b each driven, e.g. by conveyor belts, in an oppositely rotatable manner about a vertical central axis in the directions outlined by arrows, of which each comprises a rim-like web 3a and 3b, respectively, which extends in parallel with the rotational axis and which is provided on its upper edge with a horizontal flange 4a, 4b, i.e. a flange extending in a direction perpendicular to the rotational axis and projecting over the respective webs 3a and 3b outwardly. The upper side of each flange 4a, 4b is formed as a carrier surface 5a, 5b for a conveyed means 6.

The conveyed means 6 is idential with the conveyed means according to EP 582 047, which is herewith included by reference. The conveyed means 6 comprises an elongated, bar-shaped carrier 7 which is conveyed with its longitudinal central line 7a approximately in a vertically upright position. At its lower end carrier 7 comprises a hook 8 for securing the articles to be conveyed. Two substantially frustoconical rollers 9a, 9b which are rotatable about a horizontal rotational axis extending in a direction perpendicular to the longitudinal center line 7a are arranged near the upper end of carrier 7 symmetrically at both sides of the longitudinal center line 7a. The frustoconical rollers 9a, 9b are secured to carrier 7 such that their larger diameter is at the outside. A web 10a and 10b, respectively, projects beyond rollers 9a, 9b from carrier 7 at both sides and in parallel with the rotational axis of rollers 9a, 9b, the lower surface of web 10a and 10b, respectively, being formed as a support surface 11a, 11b with which the conveyed means 6 can rest on the corresponding carrier surfaces 5a and 5b, respectively, of flange 4a and 4b of wheels 2a and 2b in such a manner that the conveyed means 6 is carried along upon rotation of wheels 2a and 2b. Another web 12a and 12b, respectively, is expediently arranged on carrier 7 below web 10a and 10b, respectively, the other web 12a and 12b, respectively, extending in parallel with the first web 10a and 10b, respectively, and being spaced therefrom at a distance corresponding to the thickness of flange 4a and 4b, respectively, so that tilting of the conveyed means 6 is prevented when the conveyed means 6 is carried by only one of the two wheels 2a, 2b.

Various friction surfaces 13a and 13b which can be engaged by various friction belt drives 14a and 14b arranged on wheels 2a and 2b, whereby the conveyed means 6 can be carried along almost without slip upon rotation of wheels 2a and 2b, project between rollers 9a and 9b and hook 8 on carrier 7. The lower friction belt drives 14a, 14b can be used for driving wheels 2a, 2b and act on the lower friction surfaces 13a, 13b only from case to case, if at all.

In the extension of the vertical longitudinal center line 7a, the conveyed means 6 is provided at its upper end opposite to the hook with a projection 15 which is provided at each side with a stop surface 15a and 15b.

Between stop surfaces 15a and 15b projection 15 is so large that it can pass through a groove 16 in a guide means 17 which is formed as a switch and arranged at the point where the two wheels 2a, 2b (FIG. 1) approach one another to the greatest degree (FIG. 1). As becomes especially apparent from FIGS. 4A through 4C, guide means 17 consists of an elongated ledge into which groove 16 has been incorporated in longitudial direction and from one side. Guide means 17 includes an inlet opening 17a and an outlet opening 17b. Inlet opening 17a is larger than outlet opening 17b, which is achieved by the straight side walls 16a and 16b of groove 16 converging in funnel-like fashion, with the side walls 16a and 16b being formed as guide surfaces for projection 15. In the illustrated embodiment side walls 16a, 16b of groove 16 extend in straight configuration between inlet opening 17a and outlet opening 17b, so that groove 16 tapers continuously between the two openings. This provides a smooth continuous passage of the conveyed means through the guide means. However, it is also possible to provide the groove with only one inlet funnel in the area of the inlet opening and to give the groove between the end of the inlet funnel and the outlet opening the same width, i.e. the width of the outlet opening.

A fixing plate 18 is provided for an actuating cylinder 19, shown in FIG. 2, on the ledge-like guide means 17 in the area of the inlet opening 17a. Guide means 17 is pivotably supported with the aid of a pivot pin 20 on a stationary frame 21 about a pivot axis 20a between the inlet opening 17a and the outlet opening 17b, but closer to the inlet opening than to the outlet opening. As shown in FIG. 1, pivot axis 20a is located at the point where the distance of flanges 4a, 4b of wheels 2a, 2b is minimum. As shown in FIG. 2, the front edges of flanges 4a, 4b are spaced apart from each other at this point at a distance that slightly exceeds the width of carrier 7, so that the conveyed means 6 can pass between the two wheels 2a, 2b without being hindered.

In FIG. 1, conveyor paths 15.1 to 15.4 are plotted in broken line, the paths being traveled by projection 15 with its stop surfaces 15a, 15b, or to be more accurate, by the longitudianl center line extending through projection 15 when it passes over wheels 2a, 2b. A conveyed means 6 which is suspended with its support surface 11a on carrier surface 5a of wheel 2a thus enters along conveyor path 15.1 into the area of guide means 17 and leaves guide means 17 along conveyor path 15.2. A conveyed means 6 resting with its support surface 11b on carrier surface 5b of wheel 2b enters along conveyor path 15.3 into the area of guide means 17 and leaves it along conveyor path 15.4. All conveyor paths 15.1 to 15.4 converge in the area of the smallest distance between wheels 2a, 2b in a point.

Guide means 17 is arranged above the smallest distance between the two wheels 2a, 2b such that inlet opening 17a is arranged above the incoming conveyor paths 15.1, 15.3 and outlet opening 17b above the exiting conveyor paths 15.2 and 15.4. The guide means is pivotable about its pivot axis 20a via actuating cylinder 19 in such a manner that outlet opening 17b has to be arranged selectively above the exiting conveyor path 15.2 or the exiting conveyor path 15.4. Outlet opening 17b has here a width b which is sligthly greater than the width of projection 15 between its stop surfaces 15a, 15b.

Inlet opening 17a has a width B which is dimensioned such that inlet opening 17a bridges all incoming conveyor paths 15.1 and 15.3, so that the projections 15 of conveyed means 6 can enter into guide means 17 irrespective of the incoming conveyor paths 15.1 and 15.3 along which said projections arrive and irrespective of the exiting conveyor paths 15.2 and 15.4 to which outlet opening 17b is oriented. Hence, width B depends on the distance of the inlet opening 17a relative to the narrowest point between the two wheels 2a, 2b, on the diameter of wheels 2a, 2b, and on the width of projection 15 between stop surfaces 15a, 15b.

To improve entry into guide means 17 and the exiting of conveyed means 6 from said guide means, an inlet guide means 22 and outlet guide means 23 are provided. Both travel guide means are secured above wheels 2a, 2b to frame 21 and have each two legs 22a, 22b and 23a, 23b that are curved around the same center of curvature as wheels 2a, 2b and are arranged outside and above carrier surface 5a, 5b of the associated wheel 2a, 2b, the distance being dimensioned such that the conveyed means 6 is moved as much as possible to the interior, i.e. towards the rotational axis of the respective wheel 2a, 2b and is held in said position, so that substantially the whole support surface 11a and 11b, respectively, at web 10a and 10b, respectively, rests on the respective flange 4a, 4b of wheels 2a, 2b. Guides 22 and 23 end and begin as close as possible to the point where wheels 2a, 2b have a minimum distance from each other.

Figure 3:
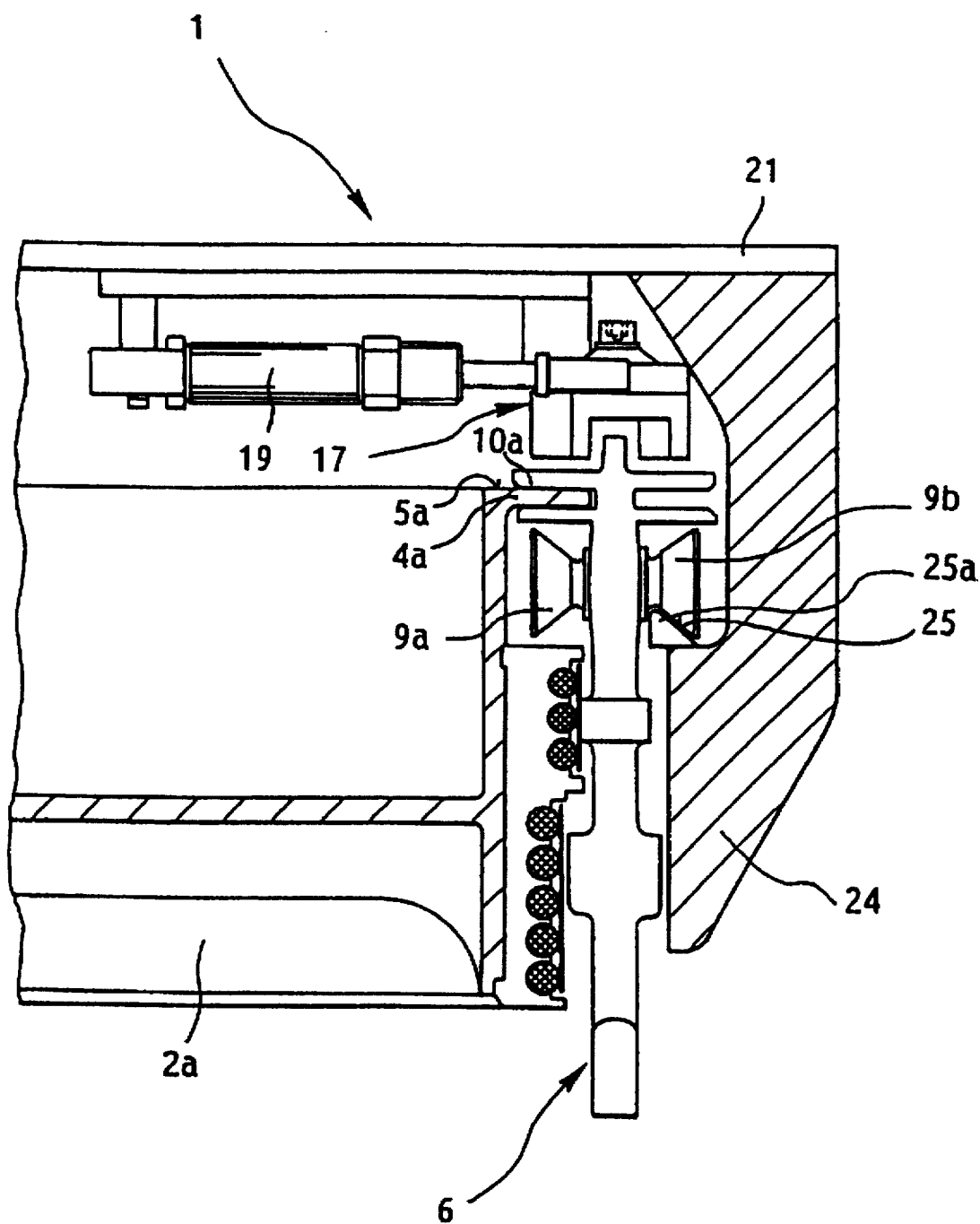
FIG. 3 is an illustration similar to FIG. 2 of another embodiment of a suspension type conveyor device according to the invention.

FIG. 3 shows another embodiment and another section of the suspension type conveyor device 1, illustrating one of the wheels 2a, the conveyed means 6 and guide means 17 with its actuating cylinder 19 of the type described already in FIGS. 1, 2 and 4. These components will not be explained again. In FIG. 3, guide means 17 serves to transfer conveyed means 6 from wheel 2a to a straight rail 24 which is formed by analogy with the rail according to EP 582 047, which is herewith referred to. Rail 24 is suspended on frame 21 and has a track 25 which is inclined outwardly downwards by analogy with the inclination of the lateral surface of the frustoconical rollers 9a, 9b, so that a tip 25a of track 25 engages into an interior flute formed by the smaller diameter of the frustoconical rollers 9a, 9b, so that the conveyed means 6 is suspended on a roller and is guided by a drive means (not shown), e.g. by a friction belt drive, over rail 24.

To transfer the conveyed means 6 from wheel 2a to rail 24, rail 24 is tangential to wheel 2a, with flange 4a being capable of gripping, at least in the area of their maximum approach, below web 10a, and roller 9b being engageable with track 25. To permit a transfer of conveyed means 6 from wheel 2a to rail 24, track 25 is cut out with its tip 25a in the area of maximum approach in which the conveyed means 6 is reliably held by flange 4a, so that the frustoconical roller can enter into the rail and passes behind track 25 in the further course of transportation.

The effect of the suspension type conveyor device according to the invention shall now be described:

In FIG. 5A all conveyed means 6 arriving at the entering conveyor paths 15.1 and 15.3 are passed onto conveyor path 15.4. To this end guide means 17 is pivoted such that its outlet opening 17b is oriented towards conveyor path 15.4. Since inlet opening 17a bridges both entering conveyor paths 15.1 and 15.3, both the conveyed means 6b introduced by wheel 2b into the area of guide means 17 and the conveyed means 6a introduced by wheel 2a into the area of guide means 17 in time-delayed fashion are received by inlet opening 17a and passed by the stop of stop surface 15a to guide surface 16a of groove 16 into the desired direction, i.e. onto the exiting conveyor path 15.4.

Should all of the conveyed means 6a, 6b arriving at the incoming conveyor paths 15.1 and 15.3 be diverted to conveyor path 15.2, guide means 17 is just pivoted such, as shown in FIG. 5B, that its outlet opening 17b is arranged above conveyor path 15.2. Although inlet opening 17a has also been pivoted to a slight degree, it is still positioned over both conveyor paths 15.1 and 15.3 because of its larger width B, so that all conveyed means 6a, 6b arriving on said conveyor paths are transferred to conveyor path 15.2 due to their stop surfaces 15 abutting on guide surface 16b of groove 16.

As shown in FIGS. 6A and 6B, the embodiment according to FIG. 3 is analogous to the first embodiment. There are again two entering conveyor paths 15.1 (on wheel 2a) and 15.3 (on rail 24) and two exiting conveyor paths 15.2 (on wheel 2a) and 15.4 (on rail 24) which converge in the area of tangential approach between wheel and rail in a point. As shown in FIGS. 6A and 6B, it is also sufficient in this embodiment when guide means 17 is pivoted such that its outlet opening 17b is located above the desired exiting conveyor path. In such a case all of the conveyed means arriving on the incoming conveyor paths 15.1, 15.3 pass onto said selected exiting conveyor path. It should also be noted that in the embodiment according to FIG. 3 there is only provided one leg 22a and 23a of the inlet and outlet guide means that keeps the conveyed means in its correct position on carrier surface 5a of wheel 2a. The outwardly and downwardly inclined track 25 assumes this function on rail 24.

In a modification of the described and illustrated embodiments the suspension type conveyor device according to the invention may have more than two incoming conveyor paths or only one or more than two exiting conveyor paths. Furthermore, the suspension type conveyor system may only consist of rails. The form of the conveyor means is also not limited to the described design. If the conveying direction is to be inverted, it is only the guide means that must be turned, so that its inlet opening is oriented towards the new inlet direction.

I claim:

1. A suspension conveyor device including conveying members conveyed in a suspended fashion, said device comprising at least two entry conveyor paths along which said members are conveyed toward a common convergence area, at least one exit conveyor path along which said members are conveyed away from said convergence area, said members being provided with at least one stop surface, and guide means located at said convergence area for transferring said conveyed members from said at least two entry conveyor paths to said at least one exit conveyor path, said guide means having an inlet opening facing said at least two entry conveyor paths that is wide enough to encompass both entry paths in the convergence area and receive the stop surfaces on the members being conveyed on both entry paths and for guiding the stop surfaces of the received members toward a narrower outlet opening that is oriented towards and encompasses said at least one exit path.

2. The suspension conveyor device of claim 1, wherein said guide means is a switch pivotable about an axis and the device includes at least two exit conveyor paths, said switch being selectively pivotable about said axis so that the outlet opening of the switch encompasses and is oriented toward either one or the other of said exit conveyor paths.

3. The suspension conveyor device of claim 2, wherein said axis of the switch is located between said inlet and outlet openings and closer to said inlet opening than said outlet opening.

4. The suspension conveyor device of claim 2 or 3, wherein said pivot axis of the switch is located where said entry conveyor paths are the closest to each other in said convergence area.

5. The suspension conveyor device of claim 2, wherein said at least two entry and said at least two exit conveyor paths are formed by a carrier surface on the circumference of two driven wheels each of which rotate about an axis parallel to each other, said conveyed members being suspended with a support surface on said carrier surfaces and moveable by the rotation of said wheels through said convergence area and switch, said axis of said switch being located at a point where the distance is minimum between said two rotatably driven wheels at which point the two entry and the two exit conveyor paths converge.

6. The suspension conveyor device of claim 2, wherein one entry and one exit conveyor path are formed by a carrier surface on the circumference of a rotatably driven wheel and said conveyed members in said paths are suspended with a support surface on said carrier surface and movable by rotation of said wheel through said convergence area and switch and the other of said entry and exit conveyor paths are formed by a track for a roller located on said conveyed members and along which said conveyed members are moved through said switch, said axis of said switch being located at a point where the distance is minimum between the driven wheel and the track at which point the two entry and the two exit conveyor paths converge.

7. The suspension conveyor device of claim 1, wherein said guide means has two guide surfaces arranged at a distance from each other and said conveyed members have two corresponding stop surfaces that are guided by said guide surfaces.

8. The suspension conveyor device of claim 7, wherein said guide surfaces are on opposite sides of a groove and said stop surfaces are arranged on a projection protruding on said conveyed member.

9. The suspension conveyor device of claim 8, wherein said groove tapers in funnel-like fashion from said inlet opening towards said outlet opening.

10. The suspension conveyor device of claim 9, wherein said conveyed members comprise carrier members for holding articles to be conveyed and said projection is located on a longitudinal center line of said carrier member and said guide means is located above said converging entry conveyor paths.

11. The suspension conveyor device of claim 1, wherein at least one entry and at least one exit conveyor path are formed by a carrier surface on the circumference of a rotatingly driven wheel, and said conveyed members are suspended with a support surface on said carrier surface and movable by the rotation of said wheel through said convergence area and guide means.

12. The suspension conveyor device of claim 1, wherein at least one entry and at least one exit conveyor path are formed by a track for a roller located on said conveyed members and along which said conveyed members are moved through said convergence area and guide means.

* * * * *